United States Patent
Sikorski, Jr.

(10) Patent No.: US 6,306,983 B1
(45) Date of Patent: Oct. 23, 2001

(54) ZIEGLER-NATTA POLYMERIZATION OF ALPHA-OLEFINS IN THE PRESENCE OF NON-POLYMERIZING OLEFINS

(75) Inventor: William Henry Sikorski, Jr., White Bear Lake, MN (US)

(73) Assignee: 3M Innovative Properties Company, Saint Paul, MN (US)

(*) Notice: Subject to any disclaimer, the term of this patent is extended or adjusted under 35 U.S.C. 154(b) by 0 days.

(21) Appl. No.: 09/312,422

(22) Filed: May 14, 1999

(51) Int. Cl.$^7$ .............................. C08F 2/00; C08F 10/06; C08F 110/06
(52) U.S. Cl. .................... 526/89; 526/124.1; 526/351; 526/348.6; 502/104; 502/115
(58) Field of Search .................. 526/124.1, 351, 526/348.6, 282, 284, 89

(56) References Cited

U.S. PATENT DOCUMENTS

| | | | |
|---|---|---|---|
| 2,894,824 | 7/1959 | Lanning | 23/285 |
| 3,074,922 | 1/1963 | Dye et al. | 260/94.9 |
| 3,732,198 | 5/1973 | Whiteley et al. | 260/94.9 |
| 4,058,654 | 11/1977 | Sutter et al. | 526/159 |
| 4,124,530 | 11/1978 | Arzoumanidis | 252/429 |
| 4,146,502 | 3/1979 | Yokoyama et al. | 252/429 |
| 4,482,687 | 11/1984 | Noshay et al. | 526/125 |
| 4,792,595 | 12/1988 | Cozewith et al. | 526/348 |
| 5,407,970 | 4/1995 | Peterson et al. | 522/33 |
| 5,536,773 | 7/1996 | Yamada et al. | 524/499 |
| 5,644,007 | 7/1997 | Davidson et al. | 526/64 |
| 5,869,418 | 2/1999 | Iiskola et al. | 502/125 |

FOREIGN PATENT DOCUMENTS

| | | |
|---|---|---|
| 0 048 627 A1 | 9/1981 | (EP) . |
| 0 048 627 A1 * | 9/1991 | (EP) . |
| 0 557 107 A2 | 8/1993 | (EP) . |

OTHER PUBLICATIONS

Kissin, *Isospecific Polymerization of Olefins with Heterogeneous Ziegler–Natta Catalysts*, Springer–Verlag New York, Inc., 1985, pp. 185–188.

\* cited by examiner

*Primary Examiner*—David W. Wu
*Assistant Examiner*—R. Harlan
(74) *Attorney, Agent, or Firm*—Philip Y. Dahl (57) ABSTRACT

A method is presented for increasing molecular weight and/or stereoregularity of poly(alpha-olefins) by polymerizing alpha-olefins in the presence of 1) a Ziegler-Natta catalyst system and 2) at least one non-polymerizing olefin which is not polymerizable under the polymerization conditions.

20 Claims, 4 Drawing Sheets

ZIEGLER-NATTA POLYMERIZATION OF ALPHA-OLEFINS IN THE PRESENCE OF NON-POLYMERIZING OLEFINS

FIELD OF THE INVENTION

This invention relates to a method for increasing molecular weight and/or stereoregularity of poly(alpha-olefins) by polymerizing alpha-olefins in the presence of 1) a Ziegler-Natta catalyst system and 2) at least one non-polymerizing olefin which is not polymerizable under the polymerization conditions.

BACKGROUND OF THE INVENTION

Ziegler-Natta catalyst systems are commonly used for polymerization of alpha-olefins.

U.S. Pat. No. 3,732,198 (Whiteley) concerns a method of polymerizing ethylene, at high pressure and temperature, employing a Ziegler-Natta catalyst pretreated with an allylic compound. The reference teaches the use of the allylic compound to suppress free radical polymerization and thereby suppress branching in the resulting polymer.

Kissin, *Isospecific Polymerization of Olefins with Heterogeneous Ziegler-Natta Catalysts*, pp. 185–188 (1985, Springer-Verlag N.Y., Inc.), concerns the addition of acetylene and allene to a Ziegler-Natta reaction mixture to halt polymerization of alpha-olefins. The reference reports that these are polymerizable additives, and therefore long runs of polyacetylene or polyallene are incorporated into the polymer chain. Once the acetylene and/or allene are consumed, polymerization of alpha-olefins resumes at the original rate.

SUMMARY OF THE INVENTION

Briefly, the present invention provides a method of increasing molecular weight and/or stereoregularity of poly (alpha-olefins) by polymerizing alpha-olefins having three or more carbon atoms in the presence of 1) a Ziegler-Natta catalyst system and 2) at least one non-polymerizing olefin which is not polymerizable under the polymerization conditions. The non-polymerizing olefin may then be volatilized or otherwise removed along with any unreacted monomer. The invention further provides a means to temper polymerization rates and reaction temperatures.

What has not been described in the art, and is provided by the present invention, is a method to provide higher molecular weight and/or more stereoregular alpha-olefin polymers, without pretreatment of the catalyst, by addition of a recoverable agent to the monomer stream. This method provides a product polymer having a distinctive molecular weight profile having a bimodal distribution and a distinctive tacticity having increased mmmm pentad content.

In this application:

"cyclic internal olefin" means a compound having a non-aromatic cyclic group wherein at least two carbon atoms of a ring are connected to each other by a double bond, e.g., cyclohexene, methyl cyclohexene, phenyl cyclohexene, and the like;

"alpha-olefin" means a compound of the formula $H_2C=CHR$ wherein R is a substituted or unsubstituted alkyl group which may be straight-chain or may contain branches or cycles; and "substituted" means substituted by conventional substituents which do not substantially interfere with the characteristics of the desired processes or products, e.g., substituents may be alkyl, alkoxy, aryl, phenyl, halo (F, Cl, Br, I), cyano, nitro, etc.

It is an advantage of the present invention to provide alpha-olefin polymers higher molecular weight and/or increased stereoregularity by a convenient means without pretreatment of the catalyst. It is a further advantage of the present invention to provide means to temper polymerization rates and reaction temperatures.

DETAILED DESCRIPTION OF PREFERRED EMBODIMENTS

The present invention provides a method for increasing molecular weight and/or stereoregularity of poly(alpha-olefins) by polymerizing alpha-olefins in the presence of 1) a Ziegler-Natta catalyst system and 2) at least one non-polymerizing olefin which is not polymerizable under the polymerization conditions.

Monomers for polymerization may include any suitable alpha-olefins or mixtures of alpha-olefins. Preferably, monomers contain between 3 and 30 carbon atoms and more preferably between 3 and 15 carbon atoms. Most preferably, monomers contain between 5 and 10 carbon atoms. Monomers may contain branch points or cycles but are preferably straight-chain. Monomers may be substituted but are preferably unsubstituted. A mixture of two or more monomers may be used to form copolymers.

The non-polymerizing olefin is any suitable olefin that will not substantially polymerize under the polymerization conditions, including homopolymerization or incorporation into the product alpha-olefin polymer. Preferably no more than trace peaks evidencing homopolymerization or incorporation into the product polymer are observed in NMR analysis of the product polymer. More preferably, no peaks are observed. The term "non-polymerizing olefin" does not include unreacted monomer molecules.

Secondary, tertiary and quaternary olefins are preferred as the non-polymerizing olefin. Secondary and tertiary olefins are more preferred, with tertiary olefins being most preferred. Cyclic olefins are also preferred, and in particular cyclohexenes. Especially preferred are cyclohexenes where the olefin is tertiary. Preferred species include 1-methyl-cyclohexene, beta-pinene, alpha- pinene, 2-carene and 3-carene. Alpha-pinene, 2-carene and 3-carene are most preferred, and especially 3-carene. (See Examples 2–7 and Table I, below). Mixtures of two or more non-polymerizing olefins may be used.

Preferably the non-polymerizing olefin is effective in relatively small amounts. Preferably the desired result is achieved with the use of 8 mole percent or less of the non-polymerizing olefin in the monomer; more preferably 6 mole percent or less, and most preferably 4 mole percent or less.

The effectiveness of the non-polymerizing olefin may be characterized in a variety of ways. One measure of effectiveness compares the inherent viscosity of a polymer made from monomer only ("IVmo") with that of a polymer made under the same conditions but from a mixture of monomer and a given mole percentage of the non-polymerizing olefin ("IVnp"). The IVnp/IVmo for 7.4 mole percent is preferably 1.7 or greater; more preferably 1.9 or greater, even more preferably 2.3 or greater, and most preferably 3.5 or greater. The IVnp/IVmo for 5.6 mole percent is preferably 2.0 or greater and more preferably 3.0 or greater. The IVnp/IVmo for 2.0 mole percent is preferably 1.5 or greater and more preferably 1.9 or greater. The IVnp/IVmo for 1.0 mole percent is preferably 1.3 or greater and more preferably 1.5 or greater.

Another measure of effectiveness compares the average molecular weight (Mw) measured by size exclusion chromatography (SEC) of a polymer made from monomer only ("Mw:mo") with that of a polymer made under the same conditions but from a mixture of monomer and a given mole percentage of the non-polymerizing olefin ("Mw:np"). The Mw:np/Mw:mo for 1.0 mole percent is preferably 1.15 or greater and more preferably 1.3 or greater. The Mw:np/Mw:mo for 6.0 mole percent is preferably 2.0 or greater and more preferably 2.5 or greater.

Preferably, characterization of the effectiveness of the non-polymerizing olefin is conducted using 1-octene monomer. Further means of characterization may be derived by reference to the Examples and other teachings herein.

Preferably, the non-polymerizing olefin species does not contain groups known to have activity as catalyst poisons. Such groups may include any of: amines, ethers, alcohols, ketones, esters, silyl ethers, and the like. Preferably, the non-polymerizing olefin species does not contain groups that are strong Lewis acids and, more preferably, does not contain any groups that are Lewis acids. Preferably, the non-polymerizing olefin species does not contain strong electron donor groups and, more preferably, does not contain any group that is a stronger electron donor than a double bond.

Preferably, the non-polymerizing olefin species binds reversibly to the catalyst and may associate and dissociate from the catalyst under polymerization conditions. Preferably, the non-polymerizing olefin species does not bind irreversibly to the catalyst.

Ziegler-Natta catalyst systems are described in Odian, G., "Principles of Polymerization", Ch. 8.4 (Second Edition, J. Wiley & Sons, New York, 1981). For a more detailed discussion, see Boor, J., "Ziegler-Natta Catalysts and Polymerizations", Ch. 19 (Academic Press, New York, 1979). Common Ziegler-Natta catalyst systems contain a transition metal compound or complex (e.g., $TiCl_3$ or $TiCl_4$) which may be supported (i.e., bound to an inorganic substrate such as $MgCl_2$) and an organometallic cocatalyst (e.g., a trialkylaluminum). Preferred catalyst systems are Lynx™ 715 or Lynx™ 1000 (Engelhard Corp.; Iselin, N.J.) with triethylaluminum.

The polymerization may be carried out by any suitable method. The polymerization may be carried out in a wide variety of reaction vessels and polymerization methods, including continuous stirred tank reactors (e.g., U.S. Pat. No. 3,074,922), loop reactors (e.g., Zacca et al. "Modeling of the Liquid Phase Polymerization of Olefins in Loop Reactors," Chem. Eng. Sc., 48, no. 22, 3743–65 (1993)), stirred tubular reactors (e.g., U.S. Pat. No. 5,644,007), screw conveyors (e.g., U.S. Pat. No. 2,894,824), extruders (e.g., U.S. Pat. No. 4,058,654), fluid bed reactors (e.g., U.S. Pat. No. 4,482,687), and static mixer reactors (e.g., U.S. Pat. No. 4,792,595). Preferably the reaction is carried out in the absence of solvent, excepting any solvent effect due to the presence of the non-polymerizing olefin or the monomer.

Most preferably the non-polymerizing olefin is added to the monomer prior to contact with the catalyst for ease of handling, processing simplicity and uniformity of results. Alternately, the non-polymerizing olefin may be combined with the catalyst first or the three components may be combined simultaneously.

The non-polymerizing olefin preferably comprises at least 0.5 mole percent of the combined amounts of alpha-olefin reactants plus non-polymerizing olefins, more preferably between 0.5 and 14 mole percent, and most preferably between 0.5 and 8 mole percent. The catalyst system should be present in an effective amount, typically between 0.0005 and 0.005 mole percent of active titanium relative to the reactant monomer and an aluminum/titanium molar ratio between 20 and 100.

The non-polymerizing olefin is preferably removed from the polymeric product. Preferably the same means are used to simultaneously remove non-polymerizing olefin and unreacted monomer. Such means include volatilizing by exposure to heat, low pressure, or both. Such means also include washing with solvent. Preferably, recovered non-polymerizing olefin is recycled to the beginning of the process and reused in subsequent polymerizations. More preferably, both non-polymerizing olefin and unreacted monomer are recycled together. Preferably, recycled material is added to the reactant mixture before the catalyst. Recycling may be achieved by either batchwise or continuous means.

As demonstrated in Examples 20C, 21 and 22 and Table III below and FIG. 2, product polymers of the present invention contain more high molecular weight polymer than comparable product polymers made without the non-polymerizing olefin. The molecular weight distribution displays a reduced main peak and a distinctive raised "shoulder" on the high molecular weight side of the main peak, which may rise to form a second peak. It is known in the art that higher molecular weight polymers can have many advantages, including increased strength and reduced need for crosslinking.

As demonstrated in Examples 29C, 30–32, 33C and 34 and Tables V and VI below and in FIG. 4, product polymers of the present invention have greater stereoregularity. Polymers according to the present invention preferably contain 50% or more mmmm pentad content, and more preferably 55% or more mmmm pentad content, and most preferably 60% or more mmmm pentad content. It is known in the art that higher stereoregularity polymers can have many advantages, including increased crystallinity, strength and stiffness.

Without wishing to be bound by any theory, it appears that the non-polymerizing olefins of the present invention function to reversibly occupy fast-reacting catalytic sites that produce shorter and/or less stereoregular polymer chains, thereby allowing more polymerization to occur at slower-reacting catalytic sites which produce longer and/or more stereoregular polymer chains.

This invention is useful in production of higher molecular weight alpha-olefin polymers by means that allow tempered polymerization rates and easier temperature control.

Objects and advantages of this invention are further illustrated by the following examples, but the particular materials and amounts thereof recited in these examples, as well as other conditions and details, should not be construed to unduly limit this invention.

EXAMPLES

Unless otherwise noted, the reagents recited in the following examples were obtained or are available from Aldrich Chemical Co., Milwaukee, Wis.

In the following Examples, polymerizations were carried out as follows. The polymerization was performed in a glass jar with an aluminum foil lined cap, made airtight by covering the threads of the jar with Teflon tape. In a nitrogen-purged glove box, the components of the polymerization were added in the following order: 40 mL of the specified alpha-olefin monomer, the specified amount of the specified non-polymerizing olefin, 5 mL of a vigorously-stirred heterogeneous catalyst solution containing Lynx™ 715 catalyst (Engelhard Corp., Iselin, N.J.) carried in the liquid alpha-olefin monomer at a concentration of 0.1 1 mg of active titanium per milliliter, and 5 mL of a cocatalyst solution containing 0.63 M triethylaluminum in the liquid alpha-olefin monomer. Except where exotherm measurements were made (see below), the jar was quickly capped, removed from the glove box, and placed in a cold water bath (15° C.) where it was shaken. After 3 hours, the jar was removed from the water bath. The lid was removed and the jar was placed in a vacuum oven (VWR Scientific, Model 1430, West Chester, Pa.) at 0.5 mm Hg and 60° C. for 15 hours to remove volatiles, including the non-polymerizing olefin and any unreacted monomer.

In the following Examples, viscosity measurements were made on 10 mL of a 0.100 g/dL solution of the polymer in toluene, using a size 50 Cannon-Fenske viscometer (Ace Glass, Vineland, N.J.) maintained at a temperature of 25.0+/−0.1° C. The inherent viscosity values reported were calculated as the reciprocal of the solution concentration multiplied by the natural log of the ratio of the efflux times of the polymer solution and an equal volume of pure toluene (units of dL/g).

In the following Examples, size exclusion chromatography (SEC) measurements were made as follows. Samples for SEC were prepared by dissolving the polymer in 1,2,4-trichlorobenzene. Approximately 25 mg of the polymer were placed in 10 mL of 1,2,4-trichlorobenzene containing 0.1% of 2,6- di-tert-butyl-4-methylphenol, an antioxidant, for 2 hours at 160° C. before passing the solution through a 0.5 micron filter. 150 microliters of the solution were injected into a two column set (Jordi Associates, Bellingham, Mass., mixed bed and 500A columns) in a Waters 150 Plus High Temperature GPC system (Waters Corp., Milford, Mass.) operated at 140° C. with 1,2,4-trichlorobenzene as the eluent. Concentration changes were detected using an internal refractive index detector. Molecular weight calculations were based upon a calibration with 3 mixtures of narrow dispersity polystyrenes (American Polymer Standards Corp., Mentor, Ohio) at concentrations of approximately 4 mg/10 mL in 1,2,4-trichlorobenzene: Standard 1: Mp=6,300, 000, 570,000, 108,000, 20,600, 845; Standard 2: Mp=1,870, 000, 470,000, 62,100, 12,300; Standard 3: Mp=940,000, 170,000, 36,000, 3970. The molecular weight calculations were performed on a computer using PL Caliber™ Version 7.01 (Polymer Laboratories Inc., Amherst, Mass.).

In the following Examples, exotherm measurements were made as follows. During polymerization, the samples were left in the glove box instead of being capped and shaken in a cold water bath. A quartz-coated thermocouple (Aldrich, Cat. No. Z27751-7, Milwaukee, Wis.) was submerged into the solution. The temperature was noted every 15 seconds over the course of one hour.

In the following Examples, nuclear magnetic resonance (NMR) measurements (499.84 MHz for $^1$H and 125.70 MHz for $^{13}$C) were made on solutions in $CDCl_3$ using a Varian Unity 500 MHz NMR spectrometer (Palo Alto, Calif.). For the basis of the polymer tacticity assignments shown in Table V and FIG. 4, see Asakura, T.; Demura, M.; Nishiyama, Y. Macromolecules 1991, 24, 2334.

Examples designated with a "C" are comparative.

Examples 1C and 2–7

Polymerization of 1-octene was performed as described above using 1-octene and either a) no non-polymerizing olefin (Comparative Example 1C) or b) 4 mL (7.4 mole percent) of the indicated non-polymerizing olefin (Examples 3–7) or c) in the case of 1-methylcyclohexene (Example 2), 3 mL (7.4 mole percent) of the non-polymerizing olefin. The inherent viscosities of the resulting polymers were measured for each sample 5 times as described above and the average results appear in Table I.

TABLE I

| Ex. | Non-polymerizing Olefin | Structure | Inherent Viscosity (dL/g) |
|---|---|---|---|
| 1C | None | None | 0.69 |
| 2 | 1-Methyl-cyclohexene | | 1.03 |
| 3 | Beta-pinene | | 1.20 |
| 4 | Limonene | | 1.22 |
| 5 | Alpha-pinene | | 1.37 |
| 6 | 2-Carene | | 1.61 |
| 7 | 3-Carene | | 2.61 |

Examples 2–7 demonstrate a variety of non-polymerizing olefins that are effective to increase the inherent viscosity of polyoctene according to the present invention.

Examples 8C, 9–13, 14C and 15–19

Figure 1:
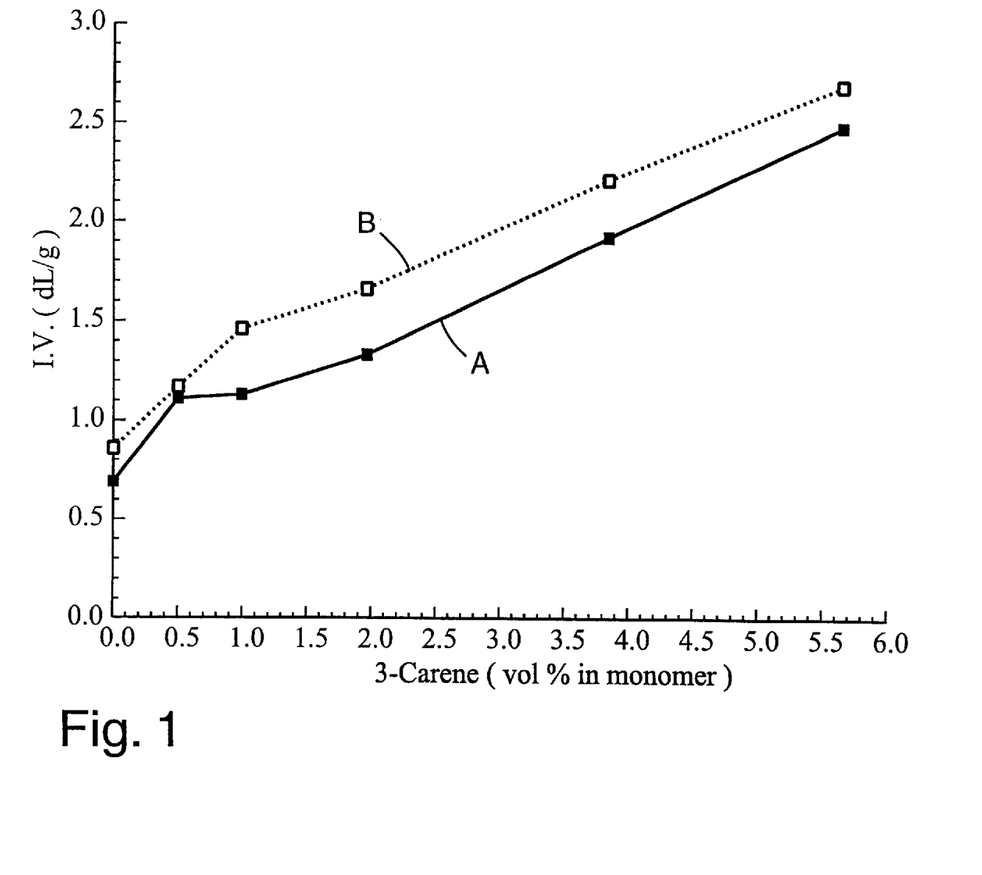
FIG. 1 is a graph of the inherent viscosities of the polymers of Examples 8C and 9–13 (Trace A) and Examples 14C and 15–19 (Trace B), charted as a function of the amount of non-polymerizing olefin added to the polymerization mixture.

Polymerization of 1-octene or 1-hexene was performed as described above using 1-octene or 1-hexene as indicated and either a) no non-polymerizing olefin (Comparative Examples 8C and 14C) or b) the indicated amount of 3-carene, as mole percent of the total amount of monomer (Examples 9–13 and 15–19). The inherent viscosities were measured for each sample five times as described above. The average results appear in Table II and FIG. 1, where trace A represents polymerization of 1-octene and trace B represents polymerization of 1-hexene.

TABLE II

| Ex. | Monomer | Amount of 3-carene (mol %) | Inherent Viscosity (dL/g) |
|---|---|---|---|
| 8C | 1-octene | none | 0.68 |
| 9 | 1-octene | 0.5% | 1.12 |
| 10 | 1-octene | 1.0% | 1.14 |
| 11 | 1-octene | 1.9% | 1.32 |
| 12 | 1-octene | 3.8% | 1.92 |
| 13 | 1-octene | 5.6% | 2.50 |
| 14C | 1-hexene | none | 0.86 |
| 15 | 1-hexene | 0.4% | 1.18 |
| 16 | 1-hexene | 0.8% | 1.49 |
| 17 | 1-hexene | 1.6% | 1.68 |
| 18 | 1-hexene | 3.1% | 2.25 |
| 19 | 1-hexene | 4.5% | 2.72 |

These examples demonstrate the dependence of the inherent viscosity of the resulting polymer on the amount of added non-polymerizing olefin.

Examples 20C, 21 and 22

Polymerization of 1-octene was performed as described above using 1-octene and either a) no non-polymerizing olefin (comparative example 20C) or b) the indicated amount of 3-carene, as mole percent of the total amount of monomer (examples 21 and 22). SEC was performed as described above and the average results appear in Table III and FIG. 2. The inherent viscosity was measured times as described above and the average results appear in Table III

TABLE III

Figures 2A, 2B, 2C:
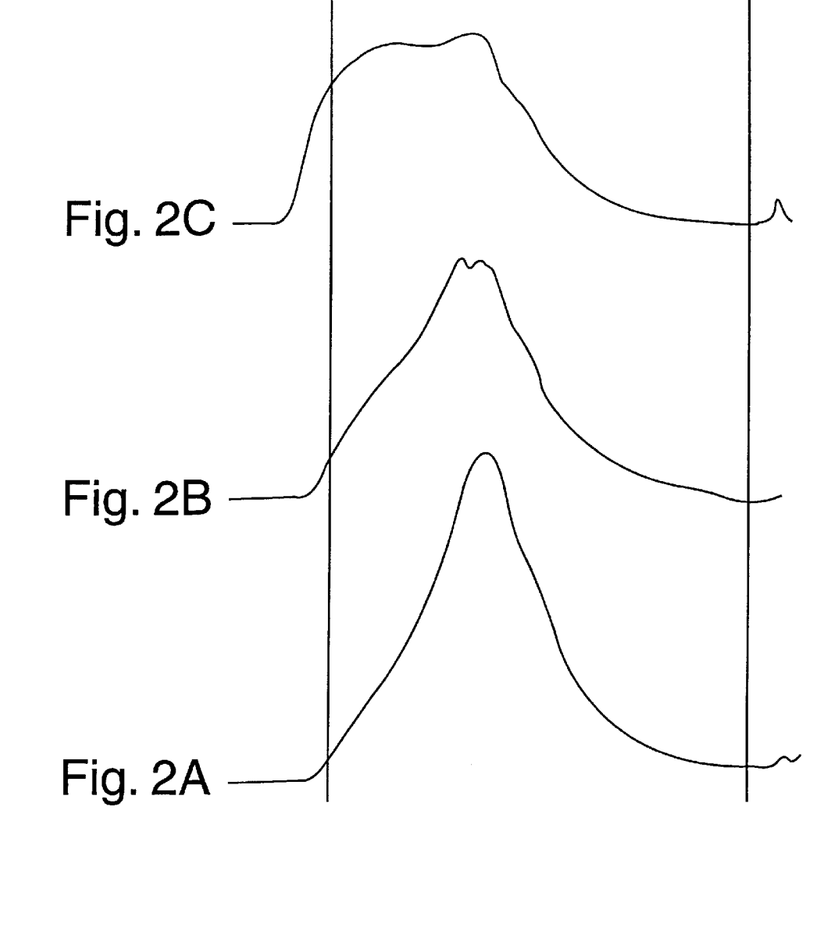
FIG. 2 is a graph indicating the molecular weight populations of the polymers of Comparative Example 20 (Trace A) and Examples 21 and 22 of the invention (Traces B and C, respectively), based on size exclusion chromatography.

| Ex. | Amount of 3-carene (Mol %) | Mw | Mn | Mw/Mn | Inherent Viscosity (dL/g) | FIG. 2 Trace |
|---|---|---|---|---|---|---|
| 20C | none | 210,000 | 21,000 | 10.0 | 0.7 | A |
| 21 | 1.0% | 290,000 | 28,000 | 10.5 | 1.1 | B |
| 22 | 5.6% | 600,000 | 38,000 | 15.7 | 2.5 | C |

Comparison of Examples 20C, 21 and 22 indicates that very little of the higher molecular weight polymer is formed in the absence of the non-polymerizing polymer, and that addition of the non-polymerizing polymer increases the fraction of higher molecular weight polymer formed.

Examples 23C and 24–26

Polymerization of 1-octene was performed as described above, as modified for exotherm measurement, using 1-octene and either a) no non-polymerizing olefin (Comparative Example 23C) or b) the indicated amount of 3-carene, as mole percent of the total amount of monomer (Examples 24–26). Exotherm measurement was performed as described above and the results appear in Table IV and FIG. 3.

TABLE IV

Figure 3:
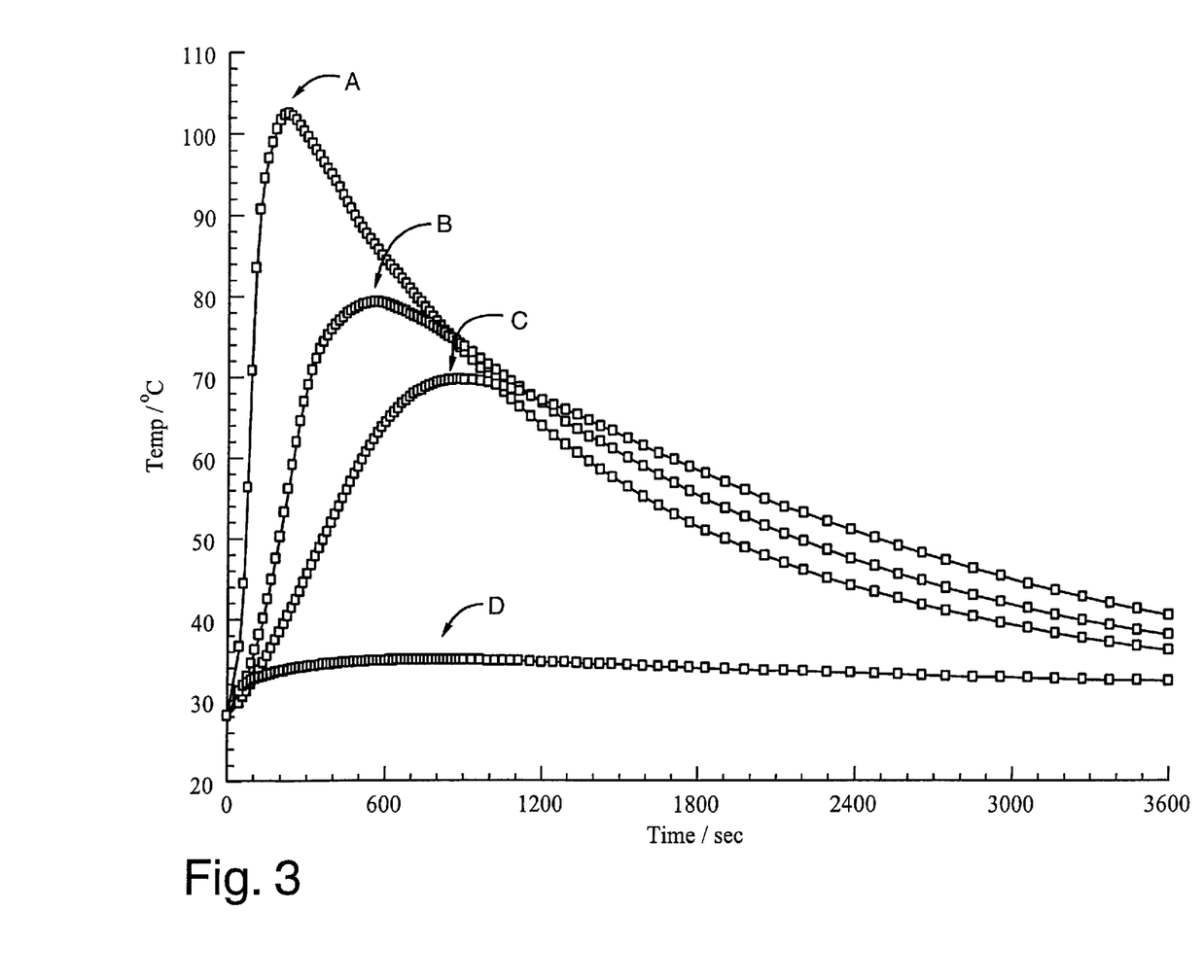
FIG. 3 is a graph of temperature vs. time demonstrating exotherm measurements performed during polymerization of Comparative Example 23 (Trace A) and Examples 24–26 of the invention (Traces B, C and D, respectively).

| Ex. | Amount of 3-carene (Mol %) | Tmax (° C.) | Time of Tmax (Min) | FIG. 3 Trace |
|---|---|---|---|---|
| 23C | none | 102 | 4 | A |
| 24 | 0.5% | 79 | 9 | B |
| 25 | 3.8% | 70 | 14.5 | C |
| 26 | 13.7% | 35 | 13 | D |

Comparison of Examples 23C and 24–26 indicates that addition of the non-polymerizing polymer according to the present invention decreases the reaction rate and the intensity of the exotherm, diminishing the need to cool the solution during polymerization.

Example 27

Polymerization of 1-octene was performed as described above, using 1-octene and 10 ml (16.5 mol%) of 3-carene. After polymerization and removal of volatiles, samples were examined by $^{13}$C NMR. The NMR indicated the presence of 0.23% residual 3-carene. The NMR indicated no incorporation of 3-carene into the polymer. This demonstrates that the 3-carene was non-polymerizing under the polymerization conditions.

Example 28

An attempted homopolymerization of 3-carene was performed by adapting the procedure as described above for pure 1-octene, using 3-carene in place of 1-octene. After 100 hours the solution was quenched with methanol and washed with water. Observation by $^{13}$C NMR indicated no evidence of isomerization, oligomerization, or polymerization of the 3-carene. This demonstrates that the 3-carene was non-polymerizing under the polymerization conditions.

Examples 29C and 30–32

Polymerizations of 1-octene were performed as described above, using 1-octene and either a) no non-polymerizing olefin (Comparative Example 29C) or b) 4 mL (7.4 mole percent) of the indicated non-polymerizing olefin (Examples 30–32). After polymerization and removal of volatiles, the samples were examined by $^{13}$C NMR. The NMR spectra are reproduced in FIG. 4. The tacticities of the polymers were determined from peak integrations, and the results appear in Table V.

TABLE V

Figure 4A:
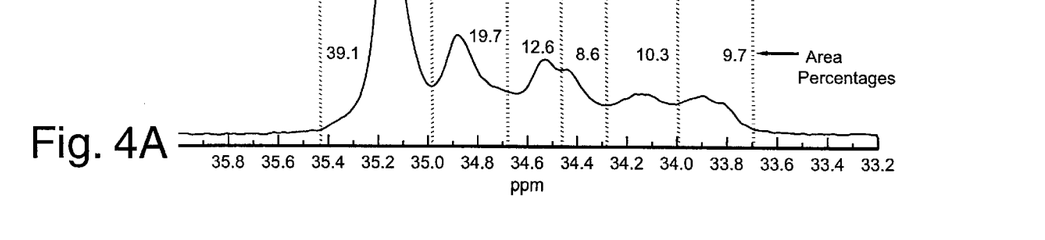
FIG. 4 is NMR spectra of the polymeric products of Comparative Example 29C (Trace A) and Examples 30–32 of the invention (Traces B, C and D, respectively).
Figures 4B, 4C, 4D:
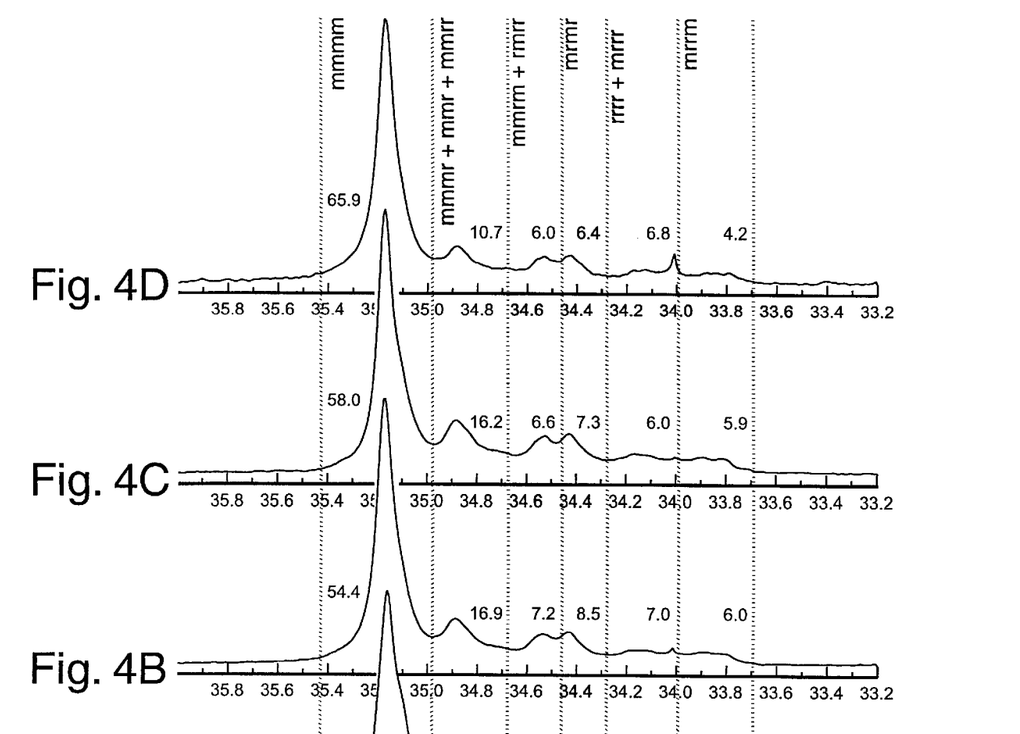

| Ex. | Non-Polymerizing Olefin | Percent mmmm | FIG. 4 Trace |
|---|---|---|---|
| 29C | None | 39.1 | A |
| 30 | Alpha-pinene | 54.4 | B |
| 31 | 2-Carene | 58.0 | C |
| 32 | 3-Carene | 65.9 | D |

These results demonstrate that addition of the non-polymerizing olefin of the present invention increases the isotacticity of the resulting polymer.

Examples 33C and 34

Polymerizations of 1-hexene were performed as described above using 1-hexene and either a) no non-polymerizing olefin (Comparative Example 33C) or b) 4 mL (7.4 mole percent) of 3-carene (Example 34). After polymerization and removal of volatiles, the samples were examined by 13C NMR. The tacticities of the polymers were determined from peak integrations, and the results appear in Table VI.

TABLE VI

| Ex. | Non-Polymerizing Olefin | Percent mmmm |
| --- | --- | --- |
| 33C | None | 44.7 |
| 34 | 3-Carene | 61.2 |

These results demonstrate that addition of the non-polymerizing olefin of the present invention increases the isotacticity of polyhexene as well as polyoctene.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

What is claimed is:

1. A method of polymerizing alpha-olefins having three or more carbon atoms comprising a polymerization step performed in the presence of 1) a Ziegler-Natta catalyst system and 2) at least one non-polymerizing olefin selected from the group consisting of: 3-carene, 2-carene, alpha-pinene, beta-pinene and 1-methylcyclohexene.

2. The method of claim 1 wherein said non-polymerizing olefin is 3-carene.

3. A method of polymerizing alpha-olefins having three or more carbon atoms comprising a polymerization step performed in the presence of 1) a Ziegler-Natta catalyst system and 2) at least one non-polymerizing olefin, wherein said non-polymerizing olefin is characterized by an IVnp/IVmo for 7.4 mole percent of 1.7 or greater.

4. A method of polymerizing alpha-olefins having three or more carbon atoms comprising a polymerization step performed in the presence of 1) a Ziegler-Natta catalyst system and 2) at least one non-polymerizing olefin, wherein said non-polymerizing olefin is characterized by an Mw:np/Mw:mo for 5.6 mole percent of 2.0 or greater.

5. A method of polymerizing alpha-olefins having three or more carbon atoms comprising a polymerization step performed in the presence of 1) a Ziegler-Natta catalyst system and 2) at least one non-polymerizing olefin, additionally comprising the step of removing said non-polymerizing olefin from a polymerized product of said polymerization step.

6. The method of claim 5 wherein said non-polymerizing olefin removed from said polymerized product is reused in a subsequent polymerization step.

7. A method of polymerizing alpha-olefins having three or more carbon atoms comprising a polymerization step performed in the presence of 1) a Ziegler-Natta catalyst system and 2) at least one non-polymerizing olefin, wherein the amount of non-polymerizing olefins present during said polymerization step is at least 0.5 mole percent of the combined amounts of alpha-olefin reactants plus non-polymerizing olefins.

8. The method of claim 7 wherein the amount of non-polymerizing olefins present during said polymerization step is between 0.5 mole percent and 14 mole percent of the combined amounts of alpha-olefin reactants plus non-polymerizing olefins.

9. The method of claim 7 wherein the amount of non-polymerizing olefins present during said polymerization step is between 0.5 mole percent and 8 mole percent of the combined amounts of alpha-olefin reactants plus non-polymerizing olefins.

10. The method of claim 7 wherein said non-polymerizing olefin is selected from the group consisting of secondary, tertiary and quaternary olefins.

11. The method of claim 7 wherein said non-polymerizing olefin is selected from the group consisting of secondary, tertiary and quaternary cyclic internal olefins.

12. The method of claim 11 wherein said non-polymerizing olefin comprises a substituted or unsubstituted cyclohexene ring.

13. A method of polymerizing alpha-olefins having three or more carbon atoms comprising a polymerization step performed in the presence of 1) a Ziegler-Natta catalyst system and 2) at least one non-polymerizing olefin, wherein the amount of non-polymerizing olefins present during said polymerization step is at least 0.5 mole percent of the combined amounts of alpha-olefin reactants plus non-polymerizing olefins, wherein said non-polymerizing olefin is selected from the group consisting of: 3-carene, 2-carene, alpha-pinene, beta-pinene and 1-methyl-cyclohexene.

14. The method of claim 13 wherein said non-polymerizing olefin is 3-carene or 2-carene.

15. The method of claim 7 wherein said non-polymerizing olefin does not bind irreversibly to a catalyst of the Ziegler-Natta catalyst system.

16. The method of claim 7 wherein said non-polymerizing olefin is effective in amounts of less than 8 mole percent of the combined amounts of alpha-olefin reactants plus non-polymerizing olefins.

17. The method of claim 7 wherein said non-polymerizing olefin is characterized by an IVnp/IVmo for 7.4 mole percent of 1.7 or greater.

18. The method of claim 7 wherein said non-polymerizing olefin is characterized by an Mw:np/Mw:mo for 5.6 mole percent of 2.0 or greater.

19. The method of claim 7 additionally comprising the step of removing said non-polymerizing olefin from a polymerized product of said polymerization step.

20. The method of claim 19 wherein said non-polymerizing olefin removed from said polymerized product is reused in a subsequent polymerization step.

* * * * *

UNITED STATES PATENT AND TRADEMARK OFFICE
CERTIFICATE OF CORRECTION

PATENT NO.    : 6,306,983 B1
DATED         : October 23, 2001
INVENTOR(S)   : William Henry Sikorski, Jr.

It is certified that error appears in the above-identified patent and that said Letters Patent is hereby corrected as shown below:

<u>Column 7,</u>
Line 39, "measured times as" should read -- measured for each sample five times as --

<u>Column 9,</u>
Line 1, "13C" should read -- $^{13}C$ --

Signed and Sealed this

Twelfth Day of March, 2002

Attest:

JAMES E. ROGAN
Attesting Officer    Director of the United States Patent and Trademark Office